(12) United States Patent
Abe

(10) Patent No.: US 12,328,415 B2
(45) Date of Patent: Jun. 10, 2025

(54) TELEPHONE RELAY DEVICE, TELECONFERENCE SERVER, TELECONFERENCE SYSTEM, TELEPHONE RELAY METHOD, AND PROGRAM

(71) Applicant: NEC Platforms, Ltd., Kawasaki (JP)

(72) Inventor: Tatsuhiko Abe, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 93 days.

(21) Appl. No.: 18/036,616

(22) PCT Filed: Oct. 15, 2021

(86) PCT No.: PCT/JP2021/038279
§ 371 (c)(1),
(2) Date: May 11, 2023

(87) PCT Pub. No.: WO2022/107520
PCT Pub. Date: May 27, 2022

(65) Prior Publication Data
US 2023/0421700 A1 Dec. 28, 2023

(30) Foreign Application Priority Data
Nov. 20, 2020 (JP) ................. 2020-193385

(51) Int. Cl.
*H04M 3/56* (2006.01)
(52) U.S. Cl.
CPC ........... *H04M 3/566* (2013.01); *H04M 3/568* (2013.01)
(58) Field of Classification Search
CPC .... H04M 3/566; H04M 3/568; H04M 3/2236; H04M 2203/5009; H04M 7/0057
See application file for complete search history.

(56) References Cited

U.S. PATENT DOCUMENTS 6,771,760 B1 * 8/2004 Vortman ............. H04M 3/5191
                                                  379/209.01
9,065,889 B2 * 6/2015 Kurashima ......... H04M 7/0072
(Continued)

FOREIGN PATENT DOCUMENTS

JP          2000-354071 A      12/2000
JP          2003-087335 A       3/2003
(Continued)

OTHER PUBLICATIONS

Supplementary European Search Report for EP Application No. 21894394.2, dated on Mar. 27, 2024.
(Continued)

*Primary Examiner* — Akelaw Teshale
(74) *Attorney, Agent, or Firm* — Sughrue Mion, PLLC

(57) ABSTRACT

The telephone relay device (30) is communicably connected to a teleconference server that relays an audio call between communication terminals participating in a teleconference via an IP network. The telephone relay device includes: a participation request unit (32) that requests the teleconference server to permit participation in the teleconference in response to receiving, from the teleconference server, an audio quality reduction notification indicating that audio quality of the audio call between the communication terminals becomes less than a predetermined level; a call making unit (33) that makes a call to a telephone terminal associated with the communication terminal in response to being permitted to participate in the teleconference; and a call relay unit (34) that relays an audio call of the teleconference between the telephone terminal and the teleconference server in response to receiving a response to the call from the telephone terminal.

18 Claims, 12 Drawing Sheets

(56) References Cited

U.S. PATENT DOCUMENTS

| | | | |
|---|---|---|---|
| 10,999,431 B1* | 5/2021 | Lee | G10L 15/22 |
| 2004/0148405 A1 | 7/2004 | Nakamoto | |
| 2006/0023061 A1* | 2/2006 | Vaszary | H04M 3/56 |
| | | | 348/14.09 |
| 2008/0240391 A1 | 10/2008 | Nishide | |
| 2008/0260132 A1* | 10/2008 | Zhang | H04M 3/56 |
| | | | 379/202.01 |
| 2016/0080559 A1* | 3/2016 | Mufti | H04M 3/42008 |
| | | | 455/416 |
| 2016/0105476 A1* | 4/2016 | Weber | H04L 12/1854 |
| | | | 370/261 |
| 2016/0112673 A1* | 4/2016 | Feng | H04L 65/403 |
| | | | 348/14.08 |
| 2016/0352913 A1* | 12/2016 | Wu | H04M 3/568 |
| 2018/0205767 A1* | 7/2018 | Vendrow | H04L 65/403 |
| 2021/0289072 A1* | 9/2021 | Baker | H04M 3/42391 |

FOREIGN PATENT DOCUMENTS

| | | |
|---|---|---|
| JP | 2008-252822 A | 10/2008 |
| JP | 2017-151889 A | 8/2017 |

OTHER PUBLICATIONS

Extended European Search Report for EP Application No. 21894394. 2, dated on Mar. 27, 2024.
International Search Report for PCT Application No. PCT/JP2021/038279, mailed on Jan. 11, 2022.

* cited by examiner

| COMMUNICATION TERMINAL ID | IN-HOUSE TELEPHONE TERMINAL ID | PBX_ID |
|---|---|---|
| UE001 | XXX-XXX-XXXX | PBX001 |
| UE002 | YYY-YYY-YYYY | PBX002 |
| UE003 | ZZZ-ZZZ-ZZZZ | PBX003 |
| ... | ... | ... |

Fig. 4

| COMMUNICATION TERMINAL ID | TELEPHONE TERMINAL ID | TERMINAL TYPE | PBX_ID |
|---|---|---|---|
| UE001 | XXX-XXX-XXXX | IN-HOUSE TELEPHONE | PBX001 |
| UE002 | YYY-YYY-YYYY | IN-HOUSE TELEPHONE | PBX002 |
| | AAA-AAA-AAAA | MOBILE TELEPHONE | – |
| UE003 | ZZZ-ZZZ-ZZZZ | IN-HOUSE TELEPHONE | PBX003 |
| ... | ... | ... | ... |

Fig. 9

TELEPHONE RELAY DEVICE, TELECONFERENCE SERVER, TELECONFERENCE SYSTEM, TELEPHONE RELAY METHOD, AND PROGRAM

This application is a National Stage Entry of PCT/JP2021/038279 filed on Oct. 15, 2021, which claims priority from Japanese Patent Application 2020-193385 filed on Nov. 20, 2020, the contents of all of which are incorporated herein by reference, in their entirety.

TECHNICAL FIELD

The present disclosure relates to a telephone relay device, a teleconference server, a teleconference system, a telephone relay method, an audio call relay method, and a program.

BACKGROUND ART

In a teleconference system to be operated on the web, data communication delays and missing may occur depending on communication conditions of Internet Protocol (IP) networks. In this case, a trouble may occur in an audio call, and progress of a teleconference may be hindered. In order to avoid such a situation, it has been proposed to participate in a teleconference from a telephone terminal.

However, in order to participate in a teleconference from a telephone terminal, a procedure such as a speaker dialing a telephone number of the teleconference from the telephone terminal and inputting a password of the teleconference is required. Further, since the speaker often does not notice that audio quality is reduced, the above-described procedure is performed while waiting for another conference participant who notices interruption or delay of the audio to communicate to the speaker. Therefore, there is a problem that the conference is interrupted in the meantime.

Therefore, Patent Literature 1 discloses that an information processing apparatus monitors communication environment and causes a server apparatus to change signal transmission conditions of video and audio according to the communication environment, by focusing on processing of the information processing apparatus to be used by participants in a conference.

CITATION LIST

Patent Literature

[Patent Literature 1] Japanese Unexamined Patent Application Publication No. 2017-151889

SUMMARY OF INVENTION

Technical Problem

However, in the information processing apparatus described in Patent Literature 1 described above, since audio data having a low audio quality level is received when a communication state is reduced, there is a possibility that progress of a teleconference is hindered by that.

In view of the above-described problem, an object of the present disclosure is to provide a telephone relay device, a teleconference server, a teleconference system, a telephone relay method, an audio call relay method, and a program that are able to avoid hindrance to progress of the teleconference.

Solution to Problem

A telephone relay device according to an aspect of the present disclosure is communicably connected to a teleconference server that relays an audio call between communication terminals participating in a teleconference via an Internet Protocol (IP) network. The telephone relay device includes a participation request unit, a call making unit, and a call relay unit. The participation request unit requests the teleconference server to permit participation in the teleconference in response to receiving an audio quality reduction notification indicating that audio quality of the audio call between the communication terminals becomes less than a predetermined level, from the teleconference server. The call making unit makes a call to a telephone terminal associated with the communication terminal in response to being permitted to participate in the teleconference. In response to receiving a response to the call from the telephone terminal, the call relay unit relays an audio call of the teleconference between the telephone terminal and the teleconference server.

A teleconference server according to an aspect of the present disclosure includes a server-side relay unit, a notification unit, and a participation processing unit. The server-side relay unit relays an audio call between communication terminals participating in a teleconference via an IP network. The notification unit transmits an audio quality reduction notification to a telephone relay device when audio quality of the audio call between the communication terminals becomes less than a predetermined level. The participation processing unit permits participation in the teleconference in response to receiving a request for permission to participate in the teleconference from the telephone relay device. The server-side relay unit transmits and receives audio call data of the teleconference to and from a telephone terminal associated with the communication terminal via the telephone relay device participating in the teleconference.

A teleconference system according to an aspect of the present disclosure includes the above-described telephone relay device and the above-described teleconference server.

A telephone relay method according to an aspect of the present disclosure is a telephone relay method for a telephone relay device communicably connected to a teleconference server that relays an audio call between communication terminals participating in a teleconference via an IP network. The telephone relay method includes: requesting the teleconference server to permit participation in the teleconference in response to receiving an audio quality reduction notification indicating that audio quality of the audio call between the communication terminals becomes less than a predetermined level, from the teleconference server; making a call to a telephone terminal associated with the communication terminal in response to being permitted to participate in the teleconference; and relaying an audio call of the teleconference between the telephone terminal and the teleconference server in response to receiving a response to the call from the telephone terminal.

A program according to an aspect of the present disclosure is a program for causing a computer to execute the above-described telephone relay method.

An audio call relay method according to an aspect of the present disclosure is an audio call relay method for a teleconference server that relays an audio call between communication terminals participating in a teleconference via an IP network. The audio call relay method includes: transmitting an audio quality reduction notification to a telephone relay device when audio quality of the audio call between the communication terminals becomes less than a predetermined level; permitting participation in the teleconference in response to receiving a request for permission to participate in the teleconference from the telephone relay device; and transmitting and receiving audio call data of the teleconference to and from a telephone terminal associated with the communication terminal via the telephone relay device participating in the teleconference.

A program according to an aspect of the present disclosure is a program for causing a computer to execute the above-described audio call relay method.

Advantageous Effects of Invention

According to the present disclosure, it is possible to provide a telephone relay device, a teleconference server, a teleconference system, a telephone relay method, an audio call relay method, and a program that are capable of avoiding hindrance to progress of a teleconference because a telephone relay device participates in a teleconference and relays an audio call by a telephone terminal in a case where audio quality is reduced.

BRIEF DESCRIPTION OF DRAWINGS

FIG. 4 is a diagram illustrating an example of a data structure of an association table according to the second example embodiment;

FIG. 9 is a diagram illustrating an example of a data structure of an association table according to the fourth example embodiment;

EXAMPLE EMBODIMENT

Figure 1:
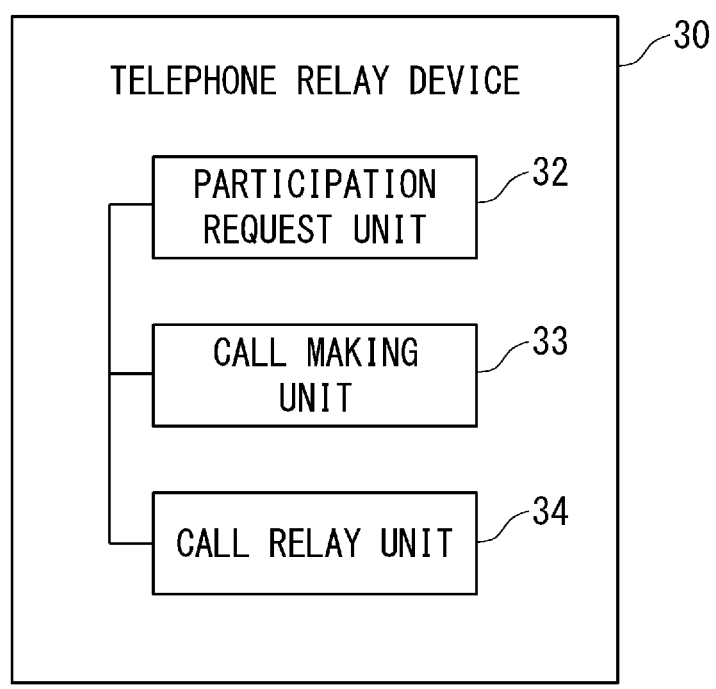
FIG. 1 is a block diagram illustrating a configuration of a telephone relay device according to a first example embodiment.

Hereinafter, the present disclosure will be described through example embodiments, but the invention according to claims is not limited to the following example embodiments. Further, not all of configurations to be described in the example embodiments are essential as a means for solving the problem. For clarity of explanation, the following description and the drawings are omitted and simplified as appropriate. In the drawings, the same elements are denoted by the same reference numerals.

First Example Embodiment

First, a first example embodiment of the present disclosure will be described by using FIG. 1. FIG. 1 is a block diagram illustrating a configuration of a telephone relay device 30 according to a first example embodiment. The telephone relay device 30 is a computer device that relays an audio call of a teleconference. The telephone relay device 30 is communicably connected to the teleconference server. Herein, the teleconference server is a computer device that relays an audio call between communication terminals participating in a teleconference via an Internet Protocol (IP) network, via an IP network.

The telephone relay device 30 includes a participation request unit 32, a call making unit 33, and a call relay unit 34.

In response to receiving an audio quality reduction notification from the teleconference server, the participation request unit 32 requests the teleconference server to permit participation in the teleconference. The audio quality reduction notification is a notification indicating that audio quality of the audio call between the communication terminals via the IP network becomes less than a predetermined level.

The call making unit 33 makes a call to a telephone terminal associated with the communication terminal in response to permission of the telephone relay device 30 to participate in the teleconference. Namely, the call making unit 33 calls the telephone terminal.

The call relay unit 34 relays the audio call of the teleconference between the telephone terminal and the teleconference server in response to receiving a response to the call from the called telephone terminal.

As described above, according to the first example embodiment, in a case where an IP network state occurs in which a communication delay or a loss occurs during a teleconference, the telephone relay device 30 participates in the teleconference, automatically establishes a connection of the audio call by the telephone terminal, and relays the audio call. Therefore, the telephone relay device 30 may avoid hindering the progress of the teleconference and continue the teleconference. On the other hand, since a user only needs to respond to the call, a burden on the user is reduced.

Second Example Embodiment

Next, a second example embodiment of the present disclosure will be described by using FIGS. 2 to 6.

Figure 2:
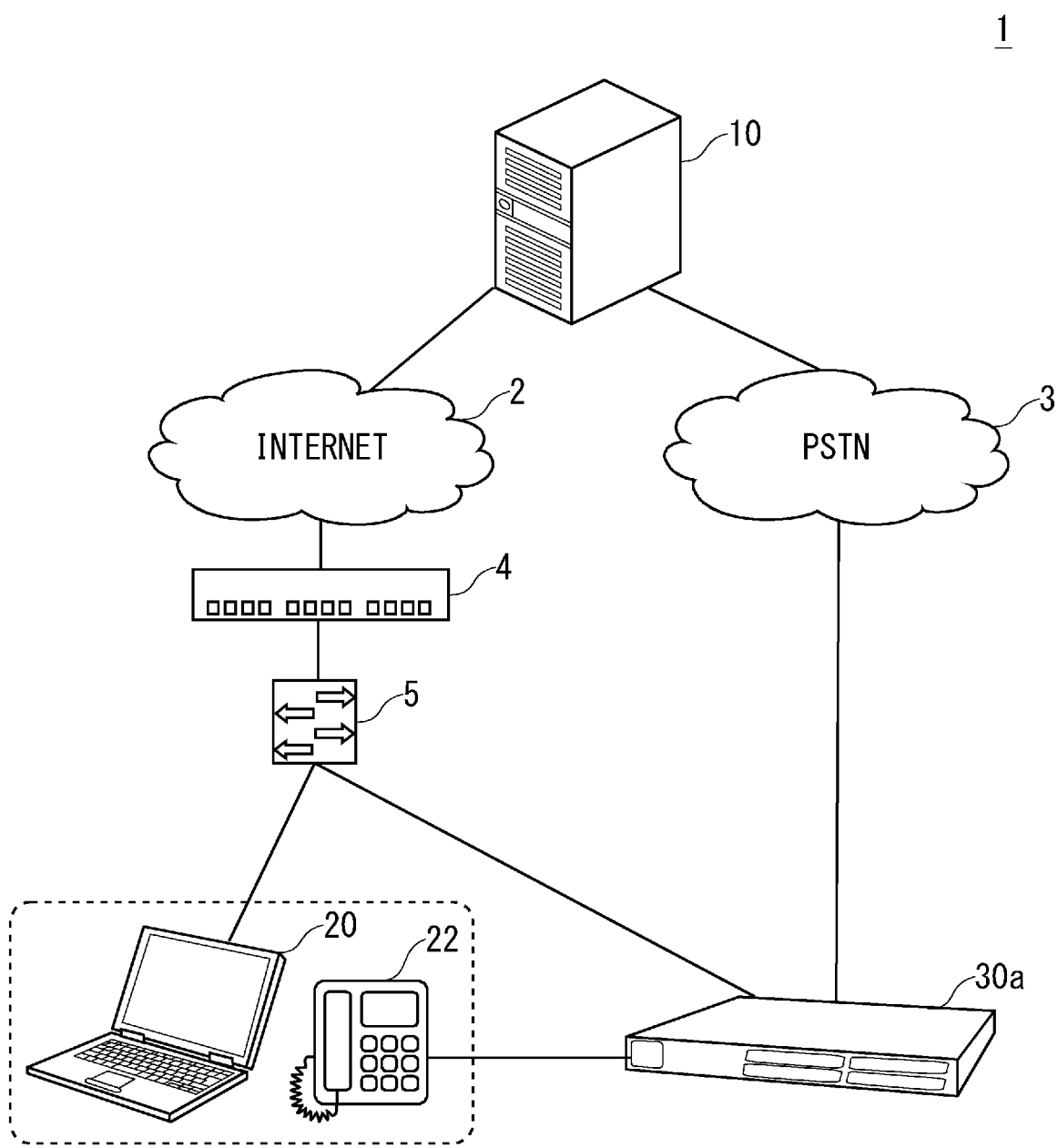
FIG. 2 is a schematic configuration diagram of a teleconference system to which the telephone relay device according to a second example embodiment can be applied.

FIG. 2 is a schematic configuration diagram of a teleconference system 1 to which a telephone relay device according to a second example embodiment can be applied. The teleconference system 1 is a computer system that provides a teleconference service to a user of a communication terminal. The teleconference system 1 includes a teleconference server 10, a communication terminal 20, an in-house telephone terminal 22, and a private branch exchange (PBX) 30a as an example of the telephone relay device 30. Although one communication terminal 20 is illustrated in this figure for clarity of explanation, it is assumed that the teleconference system 1 includes a plurality of communication terminals 20. In addition, although one in-house telephone terminal 22 is illustrated in the figure, the teleconference system 1 may include a plurality of in-house telephone terminals 22.

The teleconference server 10 is a computer device such as a server computer that relays data communication between the communication terminals 20 participating in a teleconference. The teleconference server 10 is connected to the Internet 2 as an example of an IP network and to a Public Switched Telephone Network (PSTN) as an example of a telephone line. In response to receiving audio data (audio call data) of the communication terminal 20 and other media data via the Internet 2, the teleconference server 10 transmits these data to another communication terminal 20 participating in the teleconference via the Internet 2.

When audio quality of the audio call becomes less than a predetermined level, the teleconference server 10 receives the audio call data from the in-house telephone terminal 22 usable by a user of the communication terminal 20 via a PSTN 3.

The communication terminal 20 is a personal computer, a notebook computer, a tablet terminal, or other computer devices that can input and output data, which is used by a participant (user) of the teleconference. In this figure, the communication terminal 20 is connected to the Internet 2 via a switching hub 5 and a router 4. The communication terminal 20 transmits audio call data generated in response to user's audio being picked up to the teleconference server 10 via the Internet 2, and receives audio call data of another communication terminal 20 participating in the teleconference from the teleconference server 10. Further, the communication terminal 20 transmits other media data such as image data to the teleconference server 10 and receives the other media data from the teleconference server 10 via the Internet 2.

Therefore, in the network, traffic of audio call data and other media data is mixed, and thus, there is a problem that the audio quality of audio call is likely to be reduced.

The in-house telephone terminal 22 is an in-house telephone terminal usable by a user of the communication terminal 20. The in-house telephone terminal 22 may be a fixed telephone or a mobile telephone. The in-house telephone terminal 22 is a telephone terminal under the control of the so-called PBX 30a, which is connected to the PBX 30a via an in-house line. When audio quality of an audio call by the communication terminal 20 is reduced, the user of the communication terminal 20 continues the audio call by using the in-house telephone terminal 22.

The PBX 30a is a private branch exchange associated with a communication terminal. The PBX 30a is connected to the PSTN 3 and the in-house line. The PBX 30a is connected to the Internet 2 via the switching hub 5 and the router 4. The PBX 30a is configured to participate in the teleconference and call the in-house telephone terminal 22 in response to receiving an audio quality reduction notification from the teleconference server 10. The PBX 30a relays an audio call between the teleconference server 10 and the in-house telephone terminal 22.

As a result, the teleconference server 10 receives audio call data from another communication terminal 20 or another in-house telephone terminal 22 participating in the teleconference, and transmits the audio call data to the in-house telephone terminal 22. Thus, even when the audio quality of the audio call by the communication terminal 20 becomes low, the user of the communication terminal 20 can continue the audio call by using the in-house telephone terminal 22.

Figure 3:
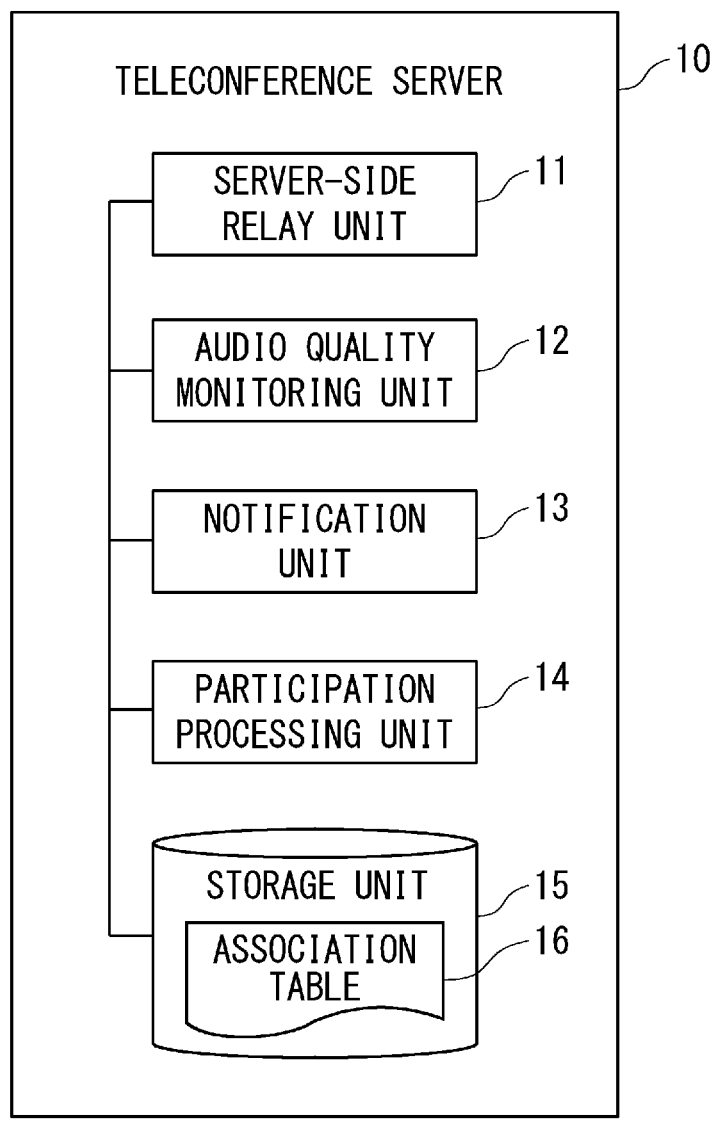
FIG. 3 is a block diagram illustrating a configuration of a teleconference server according to the second example embodiment.

FIG. 3 is a block diagram illustrating a configuration of the teleconference server 10 according to the second example embodiment. The teleconference server 10 includes a server-side relay unit 11, an audio quality monitoring unit 12, a notification unit 13, a participation processing unit 14, and a storage unit 15.

The server-side relay unit 11 performs processing of relaying an audio call between the communication terminals 20 participating in the teleconference via the Internet 2. Further, the server-side relay unit 11 transmits and receives audio call data of the teleconference to and from the in-house telephone terminal 22 associated with the communication terminal 20 by using the PSTN 3 via the PBX 30a participating in the teleconference. Namely, the server-side relay unit 11 continues to relay the audio call between the communication terminals 20 by using the PSTN 3 or by using the PSTN 3 and the Internet 2.

The audio quality monitoring unit 12 monitors the audio quality of the audio call between the communication terminals 20 via the Internet 2 for each user participating in the teleconference, i.e., for each communication terminal 20. The audio quality monitoring unit 12 may evaluate the audio quality by communication delay, jitter, packet loss, or the like.

When the audio quality evaluated by the audio quality monitoring unit 12 becomes less than a predetermined level, the notification unit 13 transmits an audio quality reduction notification to the PBX 30a via the Internet 2. The case where the audio quality becomes less than the predetermined level may be, for example, a case where the communication delay, the jitter, or the packet loss is equal to or greater than a predetermined threshold, or a case where an index determined based on the communication delay, the jitter, and the packet loss is less than a predetermined threshold. The audio quality reduction notification includes identification information (ID) of the user of the communication terminal 20 whose audio quality is reduced, an ID and a password of a teleconference in which the user participates. The ID of the teleconference may be a dial-in number. This allows the PBX 30a to easily request permission to participate in the teleconference.

The participation processing unit 14 performs processing of permitting participation in the teleconference in response to receiving a request for permission to participate in the teleconference from the PBX 30a. The participation processing unit 14 notifies the PBX 30a of an ID of the in-house telephone terminal 22 associated with a target user in response to the permission of participation to the PBX 30a.

The storage unit 15 is a storage medium that stores an association table 16 to be described later.

FIG. 4 is a diagram illustrating an example of a data structure of the association table 16 according to the second example embodiment. The association table 16 associates the ID of the communication terminal 20, the ID of the in-house telephone terminal 22, and an ID of the PBX 30a with each other.

The ID of the communication terminal 20 may be an IP address or a Media Access Control (MAC) address. The ID of the in-house telephone terminal 22 may be a telephone number or an extension number. The ID of the PBX 30a may be an IP address or a MAC address.

The association table 16 may associate an ID of the user with the ID of the in-house telephone terminal 22 and the ID of the PBX 30a in place of or in addition to the ID of the communication terminal 20. In addition, the association table 16 may store the ID and the password of the teleconference in association with the ID of the communication terminal 20.

By using the association table 16, the teleconference server 10 can easily and quickly notify the PBX 30a of the communication terminal 20 whose audio quality has reduced, and can also notify the ID of the in-house telephone terminal 22.

Figure 5:
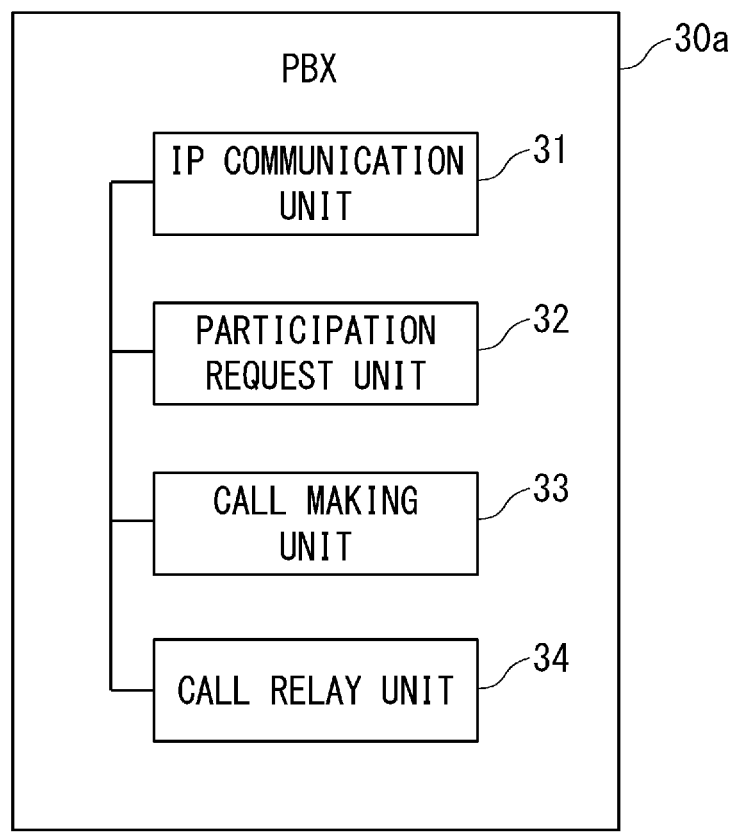
FIG. 5 is a block diagram illustrating a configuration of a PBX according to the second example embodiment.

FIG. 5 is a block diagram illustrating a configuration of the PBX 30a according to the second example embodiment. The PBX 30a includes an IP communication unit 31, a participation request unit 32, a call making unit 33, and a call relay unit 34.

The IP communication unit 31 communicates with the teleconference server 10 via the Internet 2. Specifically, the IP communication unit 31 receives the audio quality reduction notification from the teleconference server 10.

The participation request unit 32 requests the teleconference server 10 to permit participation in the teleconference by using the ID and the password of the teleconference included in the audio quality reduction notification.

The call making unit 33 makes a call to the in-house telephone terminal 22 through the use of the in-house line, by using the ID of the in-house telephone terminal 22 associated with the communication terminal 20, which is notified in response to being permitted to participate in the teleconference.

In response to the response from the in-house telephone terminal 22, the call relay unit 34 relays the audio call of the teleconference between the in-house telephone terminal 22 and the teleconference server 10 via the in-house line and the PSTN 3.

As described above, since the PBX 30a relays an audio call by using a telephone line different from the Internet 2, it is possible to avoid mixing with other media data and prevent reduction of audio quality. In addition, since the user continues the audio call via the PBX 30a, call charges can be borne by an organization (company).

Figure 6:
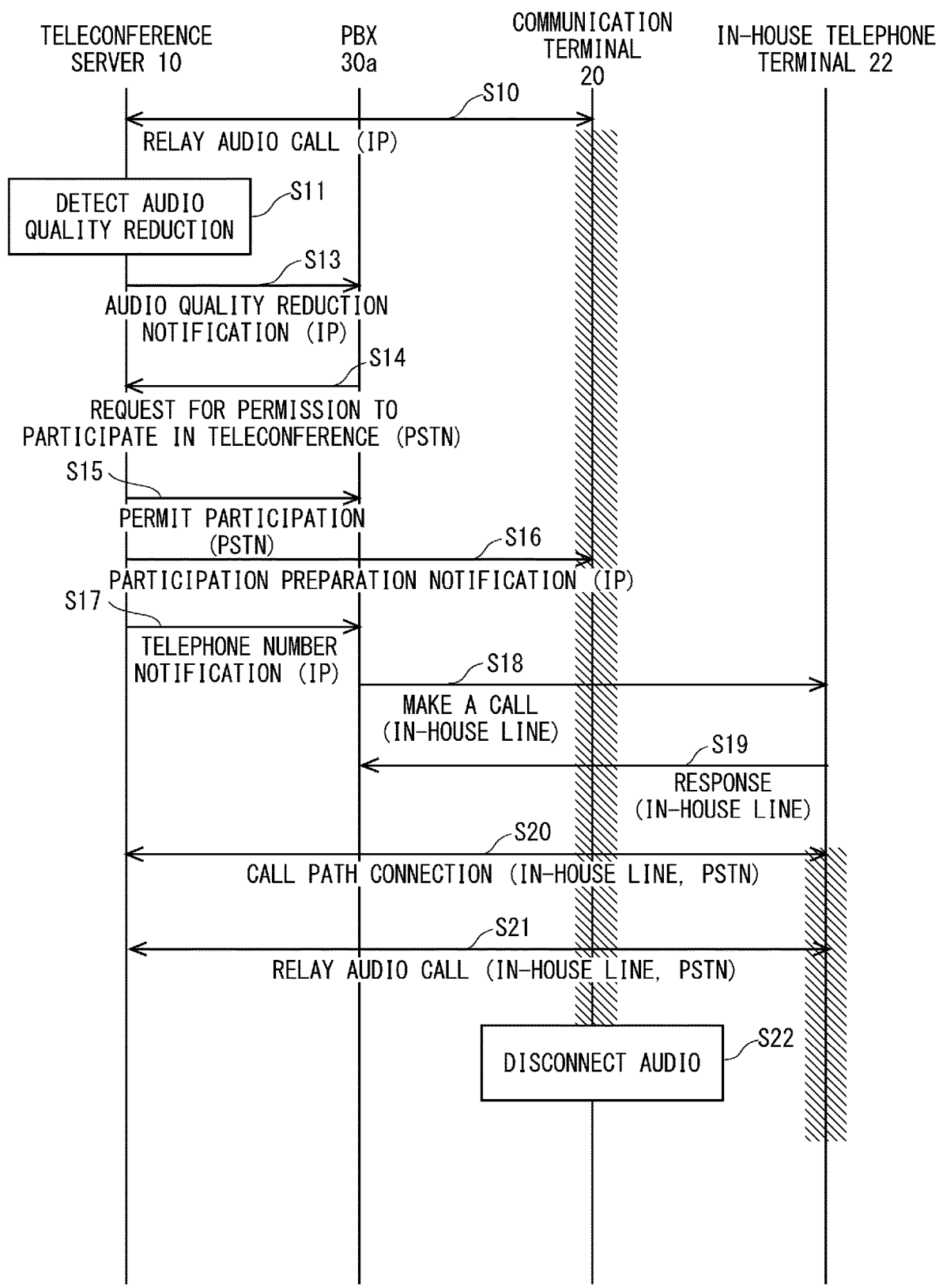
FIG. 6 is a sequence diagram illustrating an example of a processing procedure of a teleconference system according to the second example embodiment.

FIG. 6 is a sequence diagram illustrating an example of a processing procedure of the teleconference system 1 according to the second example embodiment.

First, a user of the communication terminal 20 participates in a teleconference from a teleconference application of the communication terminal and performs an audio call and other data communication. At this time, the server-side relay unit 11 of the teleconference server 10 relays the audio call of the communication terminal 20 to the communication terminal 20 to be used by another participant via the Internet 2 (step S10). Then, it is assumed that the audio quality monitoring unit 12 of the teleconference server 10 detects reduction in audio quality (step S11). The notification unit 13 of the teleconference server 10 refers to the association table 16 of the storage unit 15, identifies the PBX 30a associated with the ID of the communication terminal 20 to be targeted, and transmits an audio quality reduction notification to the PBX 30a via the Internet 2 (step S13). The audio quality reduction notification includes a dial-in number and a password of the teleconference.

In response to receiving the audio quality reduction notification by the IP communication unit 31 of the PBX 30a, the participation request unit 32 dials the teleconference and requests the teleconference server 10 to permit participation in the teleconference by using the password (step S14).

The participation processing unit 14 of the teleconference server 10 permits the PBX 30a to participate in the teleconference, and transmits a participation permission notification to the PBX 30a via the PSTN 3 (step S15). As a result, the PBX 30a is in a state of having participated in the teleconference. The participation processing unit 14 transmits a participation preparation notification indicating that participation in the teleconference is permitted to the PBX 30a, to the communication terminal 20 (step S16). As a result, the user of the communication terminal 20 can quickly switch to an audio call by the in-house telephone terminal 22. Further, the participation processing unit 14 refers to the association table 16 of the storage unit 15, specifies the telephone number of the in-house telephone terminal 22 associated with the ID of the communication terminal 20, and notifies the PBX 30a of the telephone number via the Internet 2 (step S17). This step may be performed in parallel with step S15.

Then, the call making unit 33 of the PBX 30a makes a call to the in-house telephone terminal 22 via the in-house line by using the telephone number of the in-house telephone terminal 22 (step S18). At this time, the call making unit 33 may notify the in-house telephone terminal 22 to disconnect the audio call between the communication terminal 20 and the teleconference server 10. As a result, duplication of the audio can be avoided, and the audio call can be switched smoothly.

The in-house telephone terminal 22 responds to an incoming call by user operation (step S19).

The call relay unit 34 of the PBX 30a, which has received the response, connects a call path between the teleconference server 10 and the in-house telephone terminal 22 (step S20). As a result, the call relay unit 34 starts to relay the audio call between the teleconference server 10 and the in-house telephone terminal 22 via the in-house line and the PSTN 3 (step S21).

On the other hand, in response to the response to the incoming call, the user disconnects the audio call between the communication terminal 20 and the teleconference server 10 by user operation (step S22). As a result, switching of the audio call is completed, and duplication of the audio is avoided.

In a case where the server-side relay unit of the teleconference server 10 starts to transmit and receive audio call data to and from the in-house telephone terminal 22, the server-side relay unit may automatically disconnect the audio call to and from the communication terminal 20 associated with the in-house telephone terminal 22. As a result, the audio call can be smoothly switched while reducing the burden on the user.

In addition, although the participation processing unit 14 of the teleconference server 10 notifies the PBX 30a of the telephone number of the in-house telephone terminal 22 in step S17, the ID of the communication terminal 20 or the ID of the user may be notified instead. The PBX 30a, which has received the notification, stores, in a storage unit (not illustrated), a table that associates the ID of the communication terminal 20 or the ID of the user with the telephone number of the telephone terminal that can be used by the user, and may identify the telephone number of the telephone terminal that makes a call by using the table. In this case, the ID of the in-house telephone terminal may be omitted from the association table 16 of the teleconference server 10.

As described above, according to the second example embodiment, the teleconference system 1 switches the audio call to a telephone line with stable audio quality when an IP network state in which a communication delay or a loss occurs during the teleconference is established. Therefore, it is possible to avoid hindering the progress of the teleconference and to continue the teleconference.

Third Example Embodiment

Next, a third example embodiment of the present disclosure will be described by using FIG. 7. The third example embodiment is characterized in that the PBX 30a relays an audio call between the teleconference server 10 and the in-house telephone terminal 22 via the Internet 2 instead of the PSTN 3.

Figure 7:
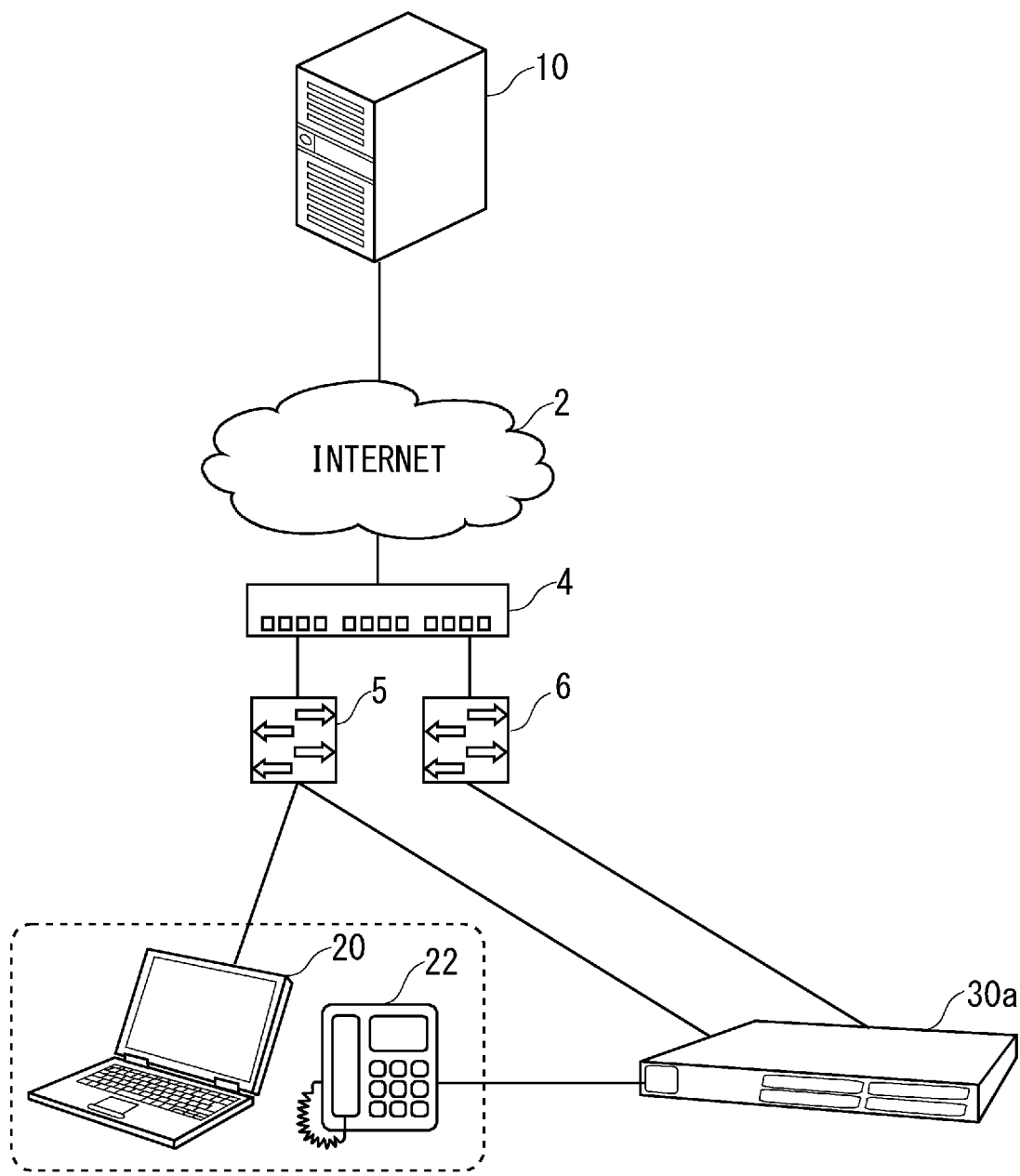
FIG. 7 is a schematic configuration diagram of a teleconference system according to a third example embodiment.

FIG. 7 is a schematic configuration diagram of a teleconference system 1b according to the third example embodiment. The teleconference system 1b is different from the teleconference system 1 in that the PBX 30a is connected to the Internet 2 via a switching hub 6 different from the switching hub 5 and a router 4, instead of the PSTN 3. In the router 4, data (audio call data) with the switching hub 6 is preferentially passed by preferential control or the like, or domains of audio call data and data (other media data) with the switching hub 5 are divided and processed. Therefore, it is possible to avoid reduction in audio quality.

Therefore, instead of step S14 in FIG. 6, the IP communication unit 31 of the PBX 30a requests the teleconference server 10 to permit participation in the teleconference via the Internet 2. Instead of step S15 in FIG. 6, the participation processing unit 14 of the teleconference server 10 transmits a participation permission notification to the PBX 30a via the Internet 2. Instead of step S21 in FIG. 6, the call relay unit 34 relays an audio call between the teleconference server 10 and the in-house telephone terminal 22 via an in-house line and the Internet 2.

As described above, also in the third example embodiment, the same effects as those of the second example embodiment are acquired.

Fourth Example Embodiment

Next, a fourth example embodiment of the present disclosure will be explained by using FIGS. 8 to 11. The fourth example embodiment is characterized in telephone relay processing in a case where a user of the communication terminal 20 can use a plurality of telephone terminals of different types.

Figure 8:
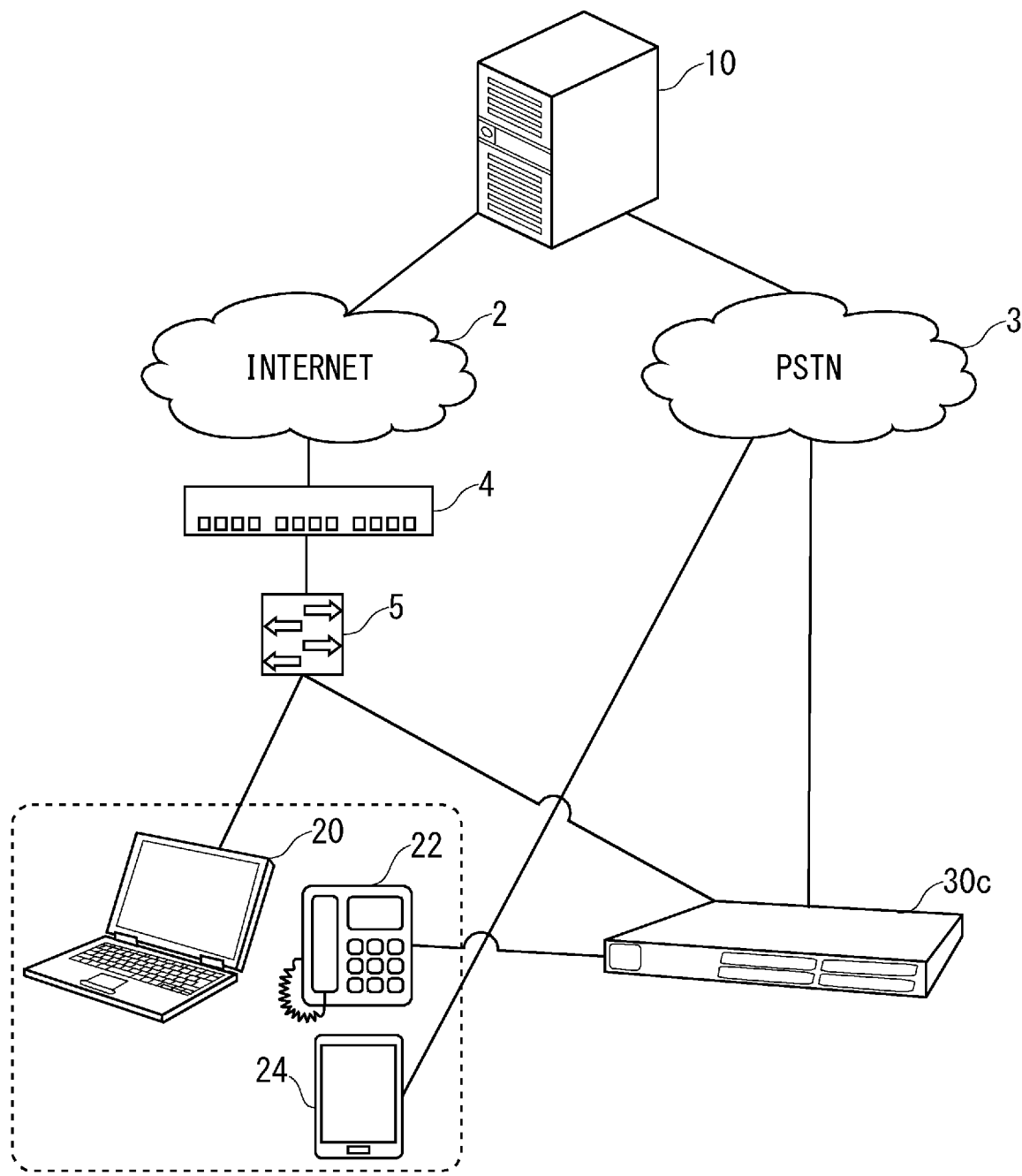
FIG. 8 is a schematic configuration diagram of a teleconference system according to a fourth example embodiment.

FIG. 8 is a schematic configuration diagram of a teleconference system 1c according to the fourth example embodiment. The teleconference system 1c has basically the same configuration and function as the teleconference system 1, but is different from the teleconference system 1 in that it includes a mobile telephone terminal 24 and a PBX 30c instead of the PBX 30a.

The mobile telephone terminal 24 is a telephone terminal that can be used by a user of the communication terminal 20 in addition to the in-house telephone terminal 22. The mobile telephone terminal 24 is a mobile telephone, a smartphone, or the like that can be connected to the PSTN 3. When the audio quality of the audio call by the communication terminal 20 is reduced, the user of the communication terminal 20 selects either the in-house telephone terminal 22 or the mobile telephone terminal 24 and continues the audio call.

The PBX 30c has basically the same configuration and function as the PBX 30a, but is different from the PBX 30a in that the call making unit 33 acquires terminal type information of the telephone terminal selected by the user from the teleconference server and determines a line to be used for the call to the telephone terminal, based on the terminal type information. The line to be used for the call is, for example, an external line or an internal line.

FIG. 9 is a diagram illustrating an example of a data structure of the association table 16 according to the fourth example embodiment. The association table 16 according to the fourth example embodiment associates the ID of the communication terminal 20, the ID of the telephone terminal, the terminal type, and the ID of the PBX 30c with each other. The terminal type is information indicating the type of the telephone terminal, and is, for example, an in-house telephone or a mobile telephone. The ID of the telephone terminal is an ID of the in-house telephone terminal 22 or the mobile telephone terminal 24, and for example, when the terminal type is an in-house telephone, the extension number may be indicated, and when the terminal type is a mobile telephone, the mobile telephone number may be indicated. In this figure, the communication terminal 20 having an ID of "UE002" is associated with two telephone terminals having different terminal types, i.e., the in-house telephone terminal 22 and the mobile telephone terminal 24. The ID of the communication terminal 20 may be associated with a plurality of telephone terminals of the same terminal type.

Figure 10:
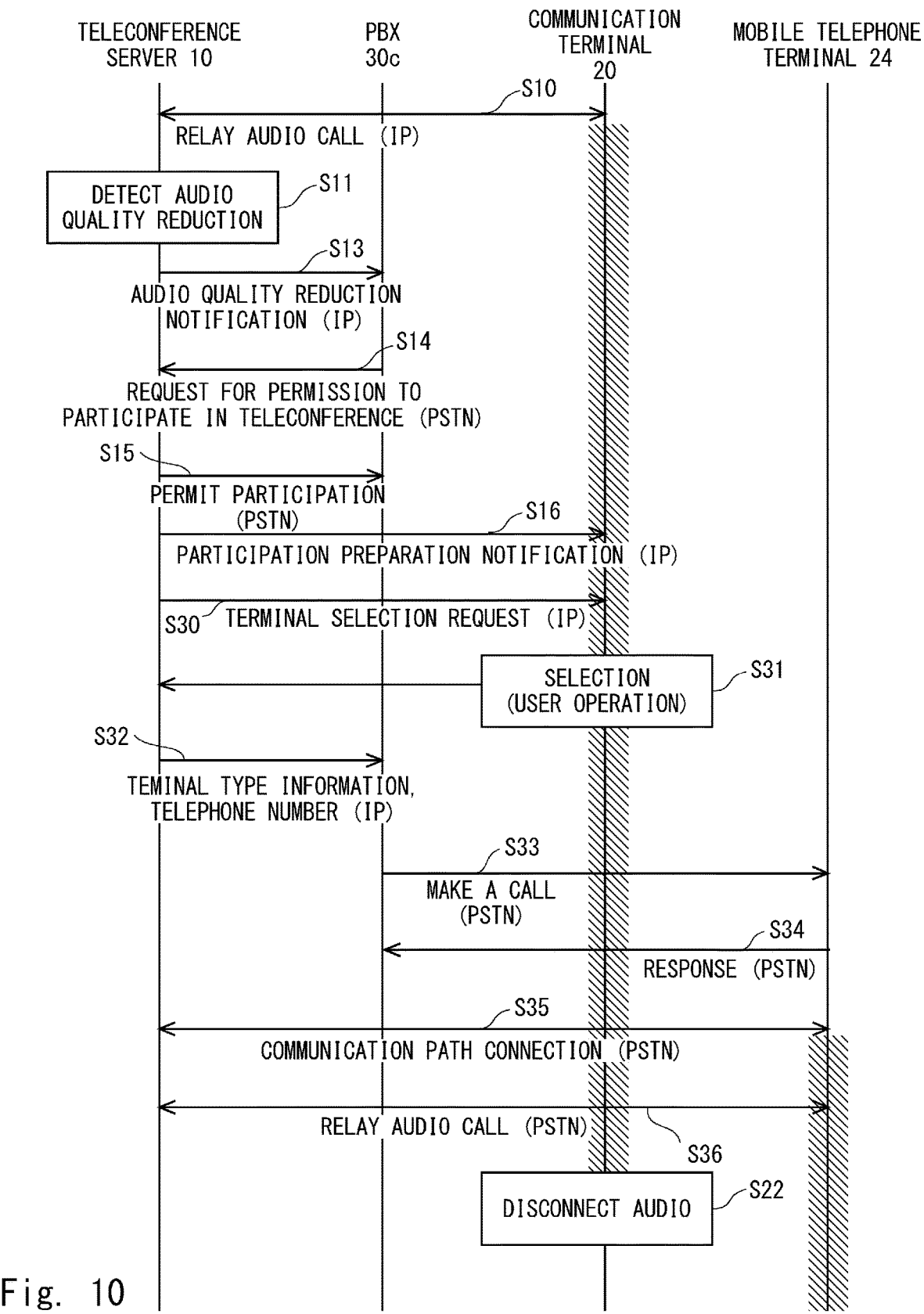
FIG. 10 is a sequence diagram illustrating an example of a processing procedure of the teleconference system according to the fourth example embodiment.

FIG. 10 is a sequence diagram illustrating an example of a processing procedure of the teleconference system 1c according to the fourth example embodiment. The same steps as those in FIG. 6 are denoted by the same symbols, and the description thereof will be omitted.

First, the teleconference system 1c executes the processing of steps S10 to S16.

Then, the participation processing unit 14 of the teleconference server 10 refers to the association table 16 of the storage unit 15, and requests the communication terminal 20 to select a telephone terminal to be used when there are a plurality of telephone terminals associated with the target communication terminal 20 (step S30).

The communication terminal 20, which has received the selection request, selects a telephone terminal to be used by user operation, and notifies the teleconference server 10 of the selected telephone terminal (step S31). When the in-house telephone terminal 22 is selected, the same processing as in steps S17 to S22 in FIG. 6 may be executed. In this example, it is assumed that the mobile telephone terminal 24 is selected.

The participation processing unit 14 of the teleconference server 10 refers to the association table 16 of the storage unit 15, acquires information of the selected telephone terminal, and transmits the information of the telephone terminal to the PBX 30c via the Internet 2 (step S32). The information of the telephone terminal includes terminal type information of the telephone terminal. In the present example, the information of the telephone terminal includes that the terminal type is a mobile telephone and a mobile telephone number of the mobile telephone terminal 24. This allows the PBX 30c to smoothly determine the line.

Then, the call making unit 33 of the PBX 30c determines to make a call using an external line, i.e., PSTN 3, from the terminal type information, uses the telephone number of the mobile telephone terminal 24, and makes a call to the mobile telephone terminal 24 by using the PSTN 3 (step S33).

The mobile telephone terminal 24 responds to the call by user operation (step S34).

The call relay unit 34 of the PBX 30c, which has received the response, connects a call path between the teleconference server 10 and the mobile telephone terminal 24 (step S35). As a result, the call relay unit 34 starts to relay the audio call between the teleconference server 10 and the mobile telephone terminal 24 via the PSTN 3 (step S36).

Figure 11:
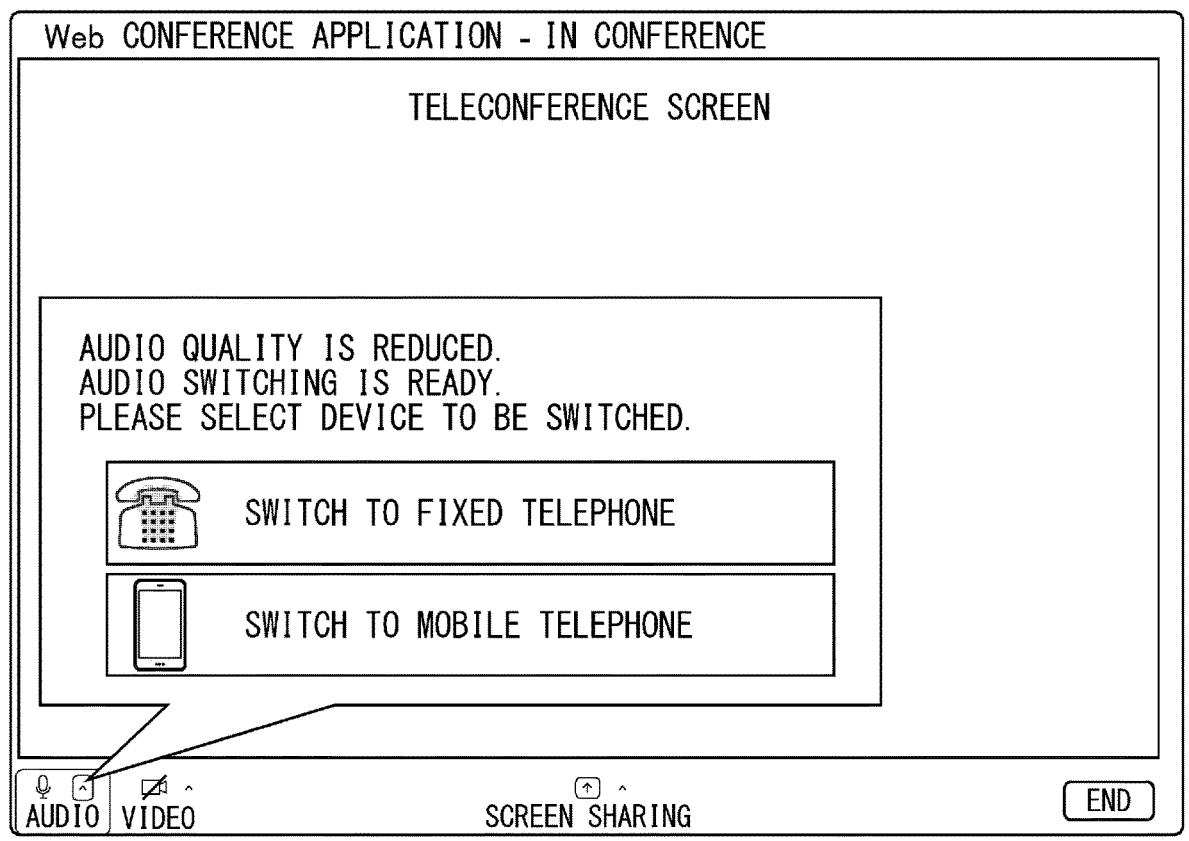
FIG. 11 is a diagram illustrating an example of a display of a communication terminal according to the fourth example embodiment.

FIG. 11 is a diagram illustrating an example of display of the communication terminal 20 according to the fourth example embodiment. A display unit (not illustrated) of the communication terminal 20 receives a participation preparation notification and a terminal selection request from the teleconference server 10, and displays a screen as illustrated in the figure.

For example, a display screen of a teleconference application (Web conference application) in which a pop-up display for prompting switching of a terminal to be used for an audio call is displayed is illustrated in the figure. When the user selects a telephone terminal of a switching destination among the displayed telephone terminals, the selected telephone terminal is called from the PBX 30c. Note that the audio output of the communication terminal 20 may be muted or the audio call may be disconnected in response to the user selecting the telephone terminal of the switching destination.

As described above, according to the fourth example embodiment, the teleconference system 1c can deal with various telephone terminals while achieving the same effects as those of the second example embodiment. In addition, since the user continues the audio call via the PBX 30c, even when an external line is used, the call charge can be borne by an organization. For example, even when a user participates in a teleconference at a personal mobile terminal from outside his/her company by telework or the like, the call charge can be borne by the company.

Note that the present disclosure is not limited to the above-described example embodiments, and can be appropriately modified without departing from the spirit thereof.

Although the present disclosure has been explained as a hardware configuration in the above-described example embodiments, the present disclosure is not limited thereto. The present disclosure can also achieve various processing related to the telephone relay method by causing a processor to execute a computer program.

Figure 12:
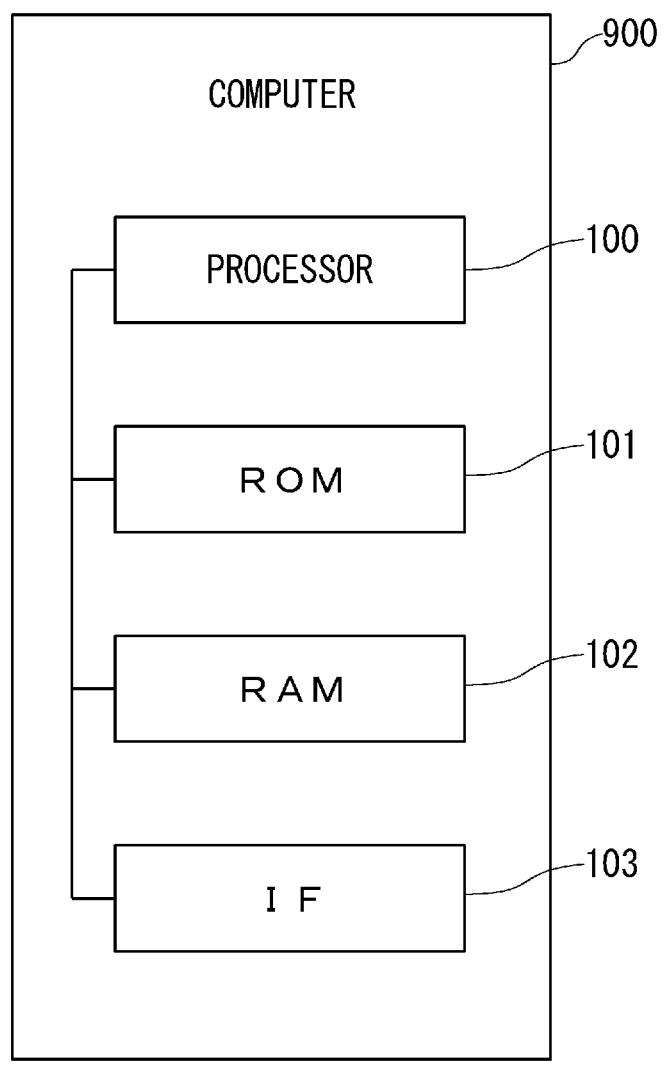
FIG. 12 is a hardware configuration diagram of a computer according to the first to fourth example embodiments.

FIG. 12 is a hardware configuration diagram of a computer 900 according to the first to fourth example embodiments.

The computer 900 includes a processor 100, a Read Only Memory 101 (ROM), a Random Access Memory 102 (RAM), and an Interface unit 103 (IF). The processor 100, the ROM 101, the RAM 102, and the interface unit 103 are connected to each other via a data bus or the like.

The processor 100 has a function as an arithmetic device that performs control processing, arithmetic processing, and the like. The processor 100 may be a Central Processing Unit (CPU), a Graphics Processing Unit (GPU), a field-programmable gate array (FPGA), a digital signal processor (DSP), or an application specific integrated circuit (ASIC), and combinations thereof. The ROM 101 has a function for storing a control program, an arithmetic program, and the like that are executed by the processor 100. The RAM 102 has a function for temporarily storing processing data and the like. The interface unit 103 inputs and outputs a signal to and from the outside via a wire or wirelessly. In addition, the interface unit 103 receives an operation of inputting data by the user, and displays information to the user. For example, the interface unit 103 of the teleconference server 10 communicates with the interface unit 103 of the communication terminal 20 and the interface unit 103 of the PBX 30a.

In the examples described above, the program, when loaded into a computer, includes an instruction group (or software code) to cause a computer to perform one or more of the functions described in the example embodiments. The program may be stored in a non-transitory computer-readable medium or a tangible storage medium. By way of example, and not limitation, computer-readable media or tangible storage media include random-access memory (RAM), read-only memory (ROM), flash memory, solid-state drive (SSD) or other memory techniques, CD-ROM, digital versatile disc (DVD), Blu-ray (registered trademark) disk or other optical disk storage, magnetic cassettes, magnetic tape, magnetic disk storage, or other magnetic storage devices. The program may be transmitted on a transitory computer readable medium or a communication medium. By way of example, and not limitation, transitory computer-readable media or communication media include electrical, optical, acoustic, or other forms of propagated signals.

In the above-described example embodiments, the computer 900 includes a computer system including a personal computer, a word processor, and the like. However, the present invention is not limited thereto, and the computer may be constituted by a server of a local area network (LAN), a host of computer (personal computer) communication, a computer system connected to the Internet, or the like. In addition, it is also possible to distribute functions among devices on a network and configure a computer over the entire network.

Some or all of the above-described example embodiments may be described as the following supplementary notes, but are not limited thereto.

Supplementary Note 1

A telephone relay device being communicably connected to a teleconference server configured to relay an audio call between communication terminals participating in a teleconference via an Internet Protocol (IP) network, the telephone relay device including:

a participation request unit configured to request the teleconference server to permit participation in the teleconference in response to receiving an audio quality reduction notification indicating that audio quality of the audio call between the communication terminals becomes less than a predetermined level, from the teleconference server;

a call making unit configured to make a call to a telephone terminal associated with the communication terminal in response to being permitted to participate in the teleconference; and a call relay unit configured to relay an audio call of the teleconference between the telephone terminal and the teleconference server in response to receiving a response to the call from the telephone terminal.

Supplementary Note 2

The telephone relay device according to Supplementary note 1, wherein the call relay unit relays the audio call between the telephone terminal and the teleconference server via a telephone line.

Supplementary Note 3

The telephone relay device according to Supplementary note 1 or 2, wherein the telephone relay device is a private branch exchange associated with the communication terminal.

Supplementary Note 4

The telephone relay device according to any one of Supplementary notes 1 to 3, wherein the call making unit acquires terminal type information of the telephone terminal from the teleconference server, and determines a line to be used for the call to the telephone terminal, based on the terminal type information.

Supplementary Note 5

The telephone relay device according to any one of Supplementary notes 1 to 4, wherein the call making unit requests the telephone terminal to disconnect the audio call between the communication terminal and the teleconference server.

Supplementary Note 6

A teleconference server including:
a server-side relay unit configured to relay an audio call between communication terminals participating in a teleconference via an Internet Protocol (IP) network;
a notification unit configured to transmit an audio quality reduction notification to a telephone relay device when audio quality of the audio call between the communication terminals becomes less than a predetermined level; and
a participation processing unit configured to permit participation in the teleconference in response to receiving a request for permission to participate in the teleconference from the telephone relay device,
wherein the server-side relay unit transmits and receives audio call data of the teleconference to and from a telephone terminal associated with the communication terminal via the telephone relay device participating in the teleconference.

Supplementary Note 7

The teleconference server according to Supplementary note 6, wherein the server-side relay unit disconnects the audio call with the communication terminal associated with the telephone terminal when the server-side relay unit starts transmitting and receiving the audio call data with the telephone terminal.

Supplementary Note 8

The teleconference server according to Supplementary note 6 or 7, wherein the participation processing unit transmits, to the communication terminal, a participation preparation notification indicating that participation in the teleconference is permitted to the telephone relay device.

Supplementary Note 9

The teleconference server according to Supplementary note 8, wherein, when there are a plurality of telephone terminals associated with the communication terminal, the participation processing unit requests the communication terminal to select a telephone terminal to be used, and transmits information of the selected telephone terminal to the telephone relay device.

Supplementary Note 10

The teleconference server according to Supplementary note 9, wherein the information of the telephone terminal includes terminal type information of the telephone terminal.

Supplementary Note 11

The teleconference server according to any one of Supplementary notes 6 to 10, further including an audio quality monitoring unit configured to monitor audio quality of the audio call between the communication terminals.

Supplementary Note 12

A teleconference system including:
the telephone relay device according to any one of Supplementary notes 1 to 5; and
the teleconference server according to any one of Supplementary notes 6 to 11.

Supplementary Note 13

A telephone relay method for a telephone relay device being communicably connected to a teleconference server configured to relay an audio call between communication terminals participating in a teleconference via an Internet Protocol (IP) network, the telephone relay method including:
requesting the teleconference server to permit participation in the teleconference in response to receiving an audio quality reduction notification indicating that audio quality of the audio call between the communication terminals becomes less than a predetermined level from the teleconference server;
making a call to a telephone terminal associated with the communication terminal in response to being permitted to participate in the teleconference; and
relaying an audio call of the teleconference between the telephone terminal and the teleconference server in response to receiving a response to the call from the telephone terminal.

Supplementary Note 14

The telephone relay method according to Supplementary note 13, further including relaying the audio call between the telephone terminal and the teleconference server via a telephone line.

Supplementary Note 15

The telephone relay method according to Supplementary note 13 or 14, further including:
acquiring terminal type information of the telephone terminal from the teleconference server; and
determining a line to be used for the call to the telephone terminal, based on the terminal type information.

Supplementary Note 16

The telephone relay method according to any one of Supplementary notes 13 to 15, further including requesting the telephone terminal to disconnect the audio call between the communication terminal and the teleconference server.

Supplementary Note 17

A program for causing a computer to execute the telephone relay method according to any one of Supplementary notes 13 to 16.

Supplementary Note 18

An audio call relay method for a teleconference server configured to relay an audio call between communication terminals participating in a teleconference via an Internet Protocol (IP) network, the audio call relay method including:
transmitting an audio quality reduction notification to a telephone relay device when audio quality of the audio call between the communication terminals becomes less than a predetermined level;

permitting participation in the teleconference in response to receiving a request for permission to participate in the teleconference from the telephone relay device;

transmitting and receiving audio call data of the teleconference to and from a telephone terminal associated with the communication terminal via the telephone relay device participating in the teleconference.

Supplementary Note 19

The audio call relay method according to Supplementary note 18, further including disconnecting the audio call with the communication terminal associated with the telephone terminal when audio call data are started to be transmitted and received to and from the telephone terminal.

Supplementary Note 20

The audio call relay method according to Supplementary note 18 or 19, further including transmitting, to the communication terminal, a participation preparation notification indicating that participation in the teleconference is permitted to the telephone relay device.

Supplementary Note 21

The audio call relay method according to Supplementary note 20, further including:
when there are a plurality of telephone terminals associated with the communication terminal, requesting the communication terminal to select a telephone terminal to be used; and transmitting information of the selected telephone terminal to the telephone relay device.

Supplementary Note 22

The audio call relay method according to Supplementary note 21, wherein the information of the telephone terminal includes terminal type information of the telephone terminal.

Supplementary Note 23

A program for causing a computer to execute the audio call relay method according to any one of Supplementary notes 18 to 22.

Although the present invention has been explained with reference to the example embodiments, the present invention is not limited to the above. Various modifications that can be understood by a person skilled in the art within the scope of the invention can be made to the configuration and details of the present invention.

This application is based upon and claims the benefit of priority from Japanese Patent Application No. 2020-193385, filed on Nov. 20, 2020, the disclosure of which is incorporated herein in its entirety.

The telephone relay device, the teleconference server, and the teleconference system according to the present example embodiments can be used, for example, in order to relay an audio call of a teleconference.

REFERENCE SIGNS LIST 1, 1b, 1c TELECONFERENCE SYSTEM
2 INTERNET
3 PSTN
4 ROUTER
5, 6 SWITCHING HUB
10 TELECONFERENCE SERVER
11 SERVER-SIDE RELAY UNIT
12 AUDIO QUALITY MONITORING UNIT
13 NOTIFICATION UNIT
14 PARTICIPATION PROCESSING UNIT
15 STORAGE UNIT
16 ASSOCIATION TABLE
20 COMMUNICATION TERMINAL
22 IN-HOUSE TELEPHONE TERMINAL
24 MOBILE TELEPHONE TERMINAL
30 TELEPHONE RELAY DEVICE
30a, 30c PBX
31 IP COMMUNICATION UNIT
32 PARTICIPATION REQUEST UNIT
33 CALL MAKING UNIT
34 CALL RELAY UNIT
100 PROCESSOR
101 ROM
102 RAM
103 INTERFACE UNIT (IF)
900 COMPUTER

What is claimed is:

1. A telephone relay device being communicably connected to a teleconference server configured to relay an audio call between communication terminals participating in a teleconference via an Internet Protocol (IP) network, the telephone relay device comprising:
a participation request unit configured to request the teleconference server to permit participation in the teleconference in response to receiving an audio quality reduction notification indicating that audio quality of the audio call between the communication terminals becomes less than a predetermined level, from the teleconference server;
a call making unit configured to make a call to a telephone terminal associated with the communication terminal in response to being permitted to participate in the teleconference; and
a call relay unit configured to relay an audio call of the teleconference between the telephone terminal and the teleconference server in response to receiving a response to the call from the telephone terminal.

2. The telephone relay device according to claim 1, wherein the call relay unit relays the audio call between the telephone terminal and the teleconference server via a telephone line.

3. The telephone relay device according to claim 1, wherein the telephone relay device is a private branch exchange associated with the communication terminal.

4. The telephone relay device according to claim 1, wherein the call making unit acquires terminal type information of the telephone terminal from the teleconference server, and determines a line to be used for the call to the telephone terminal, based on the terminal type information.

5. The telephone relay device according to claim 1, wherein the call making unit requests the telephone terminal to disconnect the audio call between the communication terminal and the teleconference server.

6. A teleconference system comprising:
the telephone relay device according to claim 1, and
a teleconference server being communicably connected to the telephone relay device
wherein the teleconference server comprises:
a server-side relay unit configured to relay an audio call between communication terminals participating in a teleconference via an Internet Protocol (IP) network;

a notification unit configured to transmit an audio quality reduction notification to the telephone relay device when audio quality of the audio call between the communication terminals becomes less than a predetermined level; and a participation processing unit configured to permit participation in the teleconference in response to receiving a request for permission to participate in the teleconference from the telephone relay device, wherein the server-side relay unit transmits and receives audio call data of the teleconference to and from a telephone terminal associated with the communication terminal via the telephone relay device participating in the teleconference.

7. The telephone relay device according to claim 1, wherein the telephone terminal is used by a user of the communication terminal.

8. A teleconference server comprising:
a server-side relay unit configured to relay an audio call between communication terminals participating in a teleconference via an Internet Protocol (IP) network;
a notification unit configured to transmit an audio quality reduction notification to a telephone relay device when audio quality of the audio call between the communication terminals becomes less than a predetermined level; and
a participation processing unit configured to permit participation in the teleconference in response to receiving a request for permission to participate in the teleconference from the telephone relay device, wherein the telephone relay device comprises a call making unit configured to make a call to a telephone terminal associated with the communication terminal in response to being permitted to participate in the teleconference,
wherein the server-side relay unit transmits and receives audio call data of the teleconference to and from the telephone terminal associated with the communication terminal via the telephone relay device participating in the teleconference.

9. The teleconference server according to claim 8, wherein the server-side relay unit disconnects the audio call with the communication terminal associated with the telephone terminal when the server-side relay unit starts transmitting and receiving the audio call data with the telephone terminal.

10. The teleconference server according to claim 8, wherein the participation processing unit transmits, to the communication terminal, a participation preparation notification indicating that participation in the teleconference is permitted to the telephone relay device.

11. The teleconference server according to claim 10, wherein, when there are a plurality of telephone terminals associated with the communication terminal, the participation processing unit requests the communication terminal to select a telephone terminal to be used, and transmits information of the selected telephone terminal to the telephone relay device.

12. The teleconference server according to claim 11, wherein the information of the telephone terminal includes terminal type information of the telephone terminal.

13. The teleconference server according to claim 8, further comprising an audio quality monitoring unit configured to monitor audio quality of the audio call between the communication terminals.

14. A telephone relay method for a telephone relay device being communicably connected to a teleconference server configured to relay an audio call between communication terminals participating in a teleconference via an Internet Protocol (IP) network, the telephone relay method comprising:
requesting the teleconference server to permit participation in the teleconference in response to receiving an audio quality reduction notification indicating that audio quality of the audio call between the communication terminals becomes less than a predetermined level, from the teleconference server;
making a call, by a call making unit, to a telephone terminal associated with the communication terminal in response to being permitted to participate in the teleconference; and
relaying an audio call of the teleconference between the telephone terminal and the teleconference server in response to receiving a response to the call from the telephone terminal.

15. The telephone relay method according to claim 14, further comprising relaying the audio call between the telephone terminal and the teleconference server via a telephone line.

16. The telephone relay method according to claim 14, further comprising:
acquiring terminal type information of the telephone terminal from the teleconference server; and
determining a line to be used for the call to the telephone terminal, based on the terminal type information.

17. The telephone relay method according to claim 14, further comprising requesting the telephone terminal to disconnect the audio call between the communication terminal and the teleconference server.

18. A non-transitory computer readable medium storing a program for causing a computer to execute the telephone relay method according to claim 14.

* * * * *